United States Patent [19]

Chimenti

[11] Patent Number: 4,624,763
[45] Date of Patent: Nov. 25, 1986

[54] SEPARATION OF DISPERSED PHASE FROM PHASE MIXTURE

[75] Inventor: Robert J. L. Chimenti, Short Hills, N.J.

[73] Assignee: Exxon Research and Engineering Company, Florham Park, N.J.

[21] Appl. No.: 601,275

[22] Filed: Apr. 17, 1984

[51] Int. Cl.[4] .................. B03C 5/02; C02F 1/48; C10G 33/02

[52] U.S. Cl. .................. 204/188; 55/107; 204/149; 204/186; 204/302; 204/306; 210/243; 210/748

[58] Field of Search ........ 204/186, 188, 149, 302–308; 210/748, 243; 55/10, 107

[56] References Cited

U.S. PATENT DOCUMENTS

| | | | |
|---|---|---|---|
| 3,412,002 | 11/1968 | Hubby | 204/180 |
| 3,415,735 | 12/1968 | Brown et al. | 204/302 |
| 3,489,669 | 1/1970 | Ruhnke | 204/302 |
| 3,567,619 | 3/1971 | Brown . | |
| 3,616,460 | 10/1971 | Watson | 204/302 |
| 3,799,855 | 3/1974 | Franse | 204/188 |
| 3,928,158 | 12/1975 | Fritsche et al. | 204/188 |
| 4,193,774 | 3/1980 | Pilat | 55/10 |
| 4,255,777 | 3/1981 | Kelly | 361/228 |
| 4,341,617 | 7/1982 | King | 204/302 |
| 4,454,016 | 6/1984 | Rabinowitz et al. | 204/308 |
| 4,469,582 | 9/1984 | Sublette et al. | 204/302 |

OTHER PUBLICATIONS

Stuetzer, "Electrohydrodynamic Precipitator", Rev. of Sci. Inst., 33, 1171 (1962).
G. V. Jorgenson & E. Will, "Improved Ion Drag Pump", Jan. 1962, Review of Scientific Instruments, vol. 33, pp. 55–56.
Pohl & Schwer, "Particle Separations by Nonuniform Electric Field in Liquid Dielectrics, Batch Methods", J. Electrochemical Soc., 107, 383 (1960).

Primary Examiner—John F. Niebling
Assistant Examiner—William T. Leader

[57] ABSTRACT

In order to separate dispersed contaminant phase from a phase mixture comprising the contaminant phase dispersed in a continuous background fluid phase (for example a water-in-oil emulsion), net unipolar charge is injected into the emulsion with an electrostatic charge injection device (1) which issues charged phase mixture into a separation vessel (6). The injected charge both induces an electric field within the embodiment in vessel (6) and also charges the water droplets, resulting in migration of contaminants within the phase mixture in a conglomeration region (33) of the vesssel (6). The mean inter-contaminant spacing is less than, and preferably very much less than (e.g. less than 1%), the smallest internal dimension of the separation vessel so that some conglomeration will occur within the liquid mixture and some will occur on the inner wall surface region of the separation vessel (6). The water droplets settle out to form a distinct water layer (38) on the bottom of the separator vessel (6). The separation effectiveness may be assisted by a bed of closely packed beads (32) occupying a further conglomeration region (34) within the separation vessel.

23 Claims, 3 Drawing Figures

SEPARATION OF DISPERSED PHASE FROM PHASE MIXTURE

BACKGROUND OF THE INVENTION

This invention relates to a method and apparatus for use in the separation of a dispersed contaminant phase from a phase mixture comprising the contaminant phase dispersed in a continuous fluid phase. The contaminant phase may be a solid, liquid, a gel or gas or any combination of these. Examples of contaminants are carbonaceous solids, metals and metal oxides (e.g., alumina fines), composites, water droplets, polymer chains and precipitates (such as wax crystals, asphaltenes, hot filtration sediment, and high molecular weight polar compounds). "Fluid phase" is used to indicate that the continuous background phase may be either a liquid or gas, liquid being the more usual. Examples of the application of this invention are the removal of particulate material, such as wax crystals, from a liquid stream or dispersed water droplets from lube stocks and other oils. Further possible applications of the invention are emulsion breakage, dehazing fuel oil, removal of fine particles from refinery process streams, particulate separation in coal liquefaction and oil shale processes, and removal of coagulated metal-rich fractions from residua.

DESCRIPTION OF THE PRIOR ART

Electrostatic separation techniques are known involving the application of an electrostatic field. For example, in U.S. Pat. No. 2,108,158 (Fisher), agglomeration of water from a water-in-oil emulsion takes place due to the action of a high field gradient existing near a pointed electrode. The field induces fluid motion which transports the water particles to a distinct water layer on which the emulsion is floating.

U.S. Pat. No. 1,940,654 (Stanton) discloses a petroleum dewaxing technique based on electrophoresis. Two possible mechanisms are described by which the technique imparts charge to the wax crystals, i.e., direct contact charging and charging by passing the crystals through a glow or brush discharge (comprising bipolar gas-phase ions).

In U.S. Pat. No. 1,838,929 (Fisher) a method which appears to operate on the principle of dielectrophoresis, is described to cause water droplets to coalesce between two electrodes. Flanges on a central electrode cause a high field gradient to exist at their edges and they are claimed to accelerate the treating action. The central electrode is conically-shaped to produce a more rapid fluid flow in the lower extremity of the treating apparatus.

Similar space-charge field precipitation methods are disclosed in U.S. Pat. Nos. 3,129,157 (Loeckenhoff) and 3,489,669 (Ruhnke) in which a particle-laden liquid is passed through a corona point ioniser so that the particles become charged and the charged particles are collected on the inner wall surfaces of a dielectric conduit located downstream of the ioniser.

It is also known from U.S. Pat. No. 3,412,002 (Hubby) to break water-in-oil emulsions electrophoretically by charging the water particles in a stream of the emulsion by physical contact with a high voltage electrode and deflecting the charged droplets laterally with respect to the stream by a transverse magnetic field.

U.S. Pat. No. 4,341,617 (King) uses sharply pointed electrodes, in an electrostatic treater for waste liquid, to concentrate the electric field at the electrode tips for encouraging flocculation of impurity particles carried by the waste liquid.

U.S. Pat. No. 3,314,872 (Waterman) disclosed causing a triboelectrically charged fluid to impinge on and transfer its charge to an electrode. This causes an electric field to be set up between the electrode and a further electrode, between which the contaminant-laden stream flows. The electric field separates the contaiminants in the same way as conventional electric treaters.

Finally, U.S. Pat. No. 3,205,160 (Stenzel) recognizes that in an electric treater where migration of unchraged contaminant particles occurs, the population density of the contaminants determines whether separation of the particles will proceed predominantly by coalescence or agglomeration, or by electophoretic deposition.

Known separation techniques have been found to operate quite satisfactorily in practice, but have the disadvantage that they are not particularly effective in the case of contaminant bubble, droplet or particle sizes below a certain level (especially of the order of submicron-size or micron-size diameter—for example about 0.1 to 100 microns). This may be due to the fact that the electrostatic force acting on each individual particle due the applied electric field becomes insufficient, when the particle size becomes sufficiently small, having regard to the viscous drag force exerted by the continuous background phase and the rate of leakage of charge from the individual particles.

SUMMARY OF THE INVENTION

"Conglomeration" as used hereinbelow throughout the specification refers to coalescence in the case of bubbles or liquid droplets of contaminant, and to agglomeration in the case of solids and gels to form contaminant particles of larger size. The method of this invention, in general, relates to the separation of a dispersed (i.e., discontinuous immiscible) contaminant phase from a phase mixture comprising the contaminant phase dispersed in a continuous fluid phase. The method involves essentially two steps. In the first step, free charge that is net unipolar (i.e. positive or negative ions which initially, are free to move through the continuous fluid phase) is introduced into the mixture. The mixture itself is introduced into a separation vessel, in a primary conglomerating region of which the free charge in the phase mixture both induces an electric field in the mixture and charges the contaminant phase. This has the result that the induced electric field and charged contaminant phase interact to bring about a migration of contaminant phase within the phase mixture. The separation vessel, in its primary conglomerating region, is free of internal collector surfaces within the phase mixture. Furthermore, the separation vessel has internal dimensions which are larger, and preferably significantly larger (e.g. 100 times or more) than the mean intercontaminant spacing for the contaminant dispersion within the phase mixture, such that at least some conglomeration of the migrating contaminant phase will occur within the phase mixture in the primary conglomerating region of the separation vessel to a sufficient degree that conglomerated contaminant phase is brought out of suspension in the phase mixture. "Mean inter-contaminant spacing" denotes the arithmetic means value before any migration of the contaminants, following the introduction of free charge, starts to occur. Depending on the nature of the contaminant, the conglomerate will come out of suspension either as bubbles which rise to the surface of the phase mixture or as droplets or gel-like globules or conglomerated particles which will either rise or, more usually, settle, according to the relative densities of the contaminant phase and the fluid with which it is in contact. The method according to the present invention may also involve the step of separating the clarified fluid, by for example merely discharging it from the separation vessel, but alternatively the conglomerated contaminant phase may be separated from the phase mixture. For example with a liquid contaminant whose density is such as to cause it to settle to the bottom of the separation vessel in which the above-described separation technique takes place, a valve can be provided for periodically or containously draining-off liquid from the settled layer of contaminant phase.

According to the present invention, apparatus that is suitable for separating the dispersed contaminant phase from the phase mixture comprises means for introducing free charge that is net unipolar into the mixture, together with the separation vessel itself which receives and contains phase mixture that has been charged by the charge introduction means. The contaminant phase is then separated from the phase mixture in the separation vessel in the manner described above.

The basis for the effective separation that can be achieved when putting this invention into effect is believed by the inventors to be as follows. For simplicity, the following description applies to the case where the continuous background phase is a liquid, but the differences where it is a gas are discussed briefly later. The first step in the process is the production of an excess (i.e. net unipolar—positive or negative) charge density in the otherwise electrically-neutral multiphase fluid mixture. Several techniques are available to produce a transient or steady-excess charge density. Broadly speaking, such methods fall into two general categories, namely: (1) injection of excess charge across the interface or boundary which confines the contaminant-/background phase mixture, and (2) volumetric charge introduction techniques into the bulk of the fluid mixture. Examples of the first category include electron beam and high energy particle radiation, photoemission and charge transport by a moving fluid. Reference is hereby directed to U.S. Pat. No. 4,255,777 in the name Arnold J. Kelly, assigned to the present assignees, the contents of which are expressly incorporated herein by reference and which discloses charge injection predominantly or solely by field emission. Electron beam, photoemission and field emission are all examples of electron emission. Examples of the second category are photoionization of either or both of the contaminant and background phases and secondary ionization by thermalization of high energy particle irradiation of the phase mixture. These examples all involve ionic dissociation within the phase mixture.

It is necessary that there be an excess of free charge in the sense of a sufficient abundance that an effective migration of contaminant will occur. The charge introduced into any stream to be decontaminated must be net negative or net positive. However, providing this requirement is met, then it is equally possible to introduce the excess charge using two streams of the same contaminant-bearing liquid of opposite but unequal levels of charge or alternating net positive and net negative streams.

The second step in the process is the transference of the major portion of the excess charge to the contaminants in the liquid. In a preferred way of performing the invention in which a charge injector, such as disclosed in the aforesaid U.S. Pat. No. 4,255,777, is used for introducing net unipolar free excess charge into a contaminant-laden stream, the stream issues from the charge injector as a continuous stream or spray through a gas or vapor space, usually an air space, and enters a separation vessel where a body of charged liquid is collected. The gas or vapor space is provided to enable the charged fluid to exit the charge injector with high velocity to efficiently sweep out the injected charge and also to eliminate any charge dissipation path back to the charge injector. Such decoupling of the separation vessel from the charge injector is important for achieving a high level and high efficiency of charge injection. It is of no particular importance to the effective separation of the dispersion from the liquid whether the dispersion-laden stream is sprayed by the charge injector or simply issues as a continuous stream into the sepration vessel, particularly at relatively high velocity throughputs in the charge injector. However, when the liquid is sprayed, the individual liquid droplets are in general separated from one another and this can be important where lower throughput velocities, closer to the drift velocity of the individual charges, are employed. It is however remarked that it is necessary that there be no contact between the spray or stream passing through the gas or vapor space and the surrounding separation vessel wall, in order to avoid charge dissipation. Where the continuous background phase is a gas, this can be achieved by introducing a secondary gas flow which provides an inner annular protective sheath on the surrounding wall surfaces. Suitably, the gas or vapor space can be provided by the ambient atmosphere separating the charge injector from the separation vessel, or it can be enclosed and a purge gas, e.g. nitrogen, circulated through the space to avoid any risk of explosion or chemical reaction. In addition, the purge gas helps to obtain uniform separation results irrespective of changes in ambient conditions, especially humidity, which can affect the rate of depletion of charge where an air space is present. In the absence of any such gap, reduced separation efficiencies will result. According to a development, the gas or vapor space is pressurised, which can maintain a satisfactory throughput rate in the separation vessel even for rather viscous liquids and can increase the throughput rate for less viscous liquids. In the separation region, it is assumed that the excess charge density greatly exceeds the liquid background charge density (i.e. the density of bipolar charge carriers which are intrinsic to the liquid and which result in the conductivity of the liquid); then, the induced electric field in the separation region caused by the excess charge density will act on the individual charge carriers and drive them to the boundaries of the liquid mixture. Some of the charge will be intercepted by the individual contaminants of the contaminant dispersion and the contaminants will thereby become charged.

The next part in the process involves the interaction of the migrating contaminants in the bulk of the liquid mixture. In this case, the contaminants are present in the liquid mixture at number densities where the mean contaminant—contaminant separation is less than, and preferably significantly less than, the smallest of the internal dimensions of the separation vessel (e.g. its diameter, in the case of an upright cylindrical separation vessel). Agglomeration or coalescence of the contaminants will occur to form large particles, droplets or bubbles, as the case may be. The basis for this mechanism is believed to be as follows.

The contaminant particles, droplets or bubbles ("particles") in general have a wide distribution of diameters and charge levels. In some cases many of the particles will be uncharged. Consequently, any individual charge contaminant will move in response to the macroscopic electric field produced by the distribution of free charge in the phase mixture with a non-zero relative velocity with respect to most of the other contaminants. Thus, a moving charged contaminant may be expected to undergo collisions with both charged and uncharged contaminants during its transit towards the boundary of the liquid mixture, providing the distance to the boundary sufficiently exceeds the distance to the next nearest contaminant and even though the charges on the contaminants are of the same polarity. The collision cross-section for the case of a charged and uncharged contaminant is higher than the collision cross-section for two uncharged contaminants since the charged particle induces a dipole moment in the uncharged particle as the distance between them diminishes during the interval leading up to the collision. Thus, attractive force exists and becomes stronger as the particles approach each other. The collision rate for a charged contaminant in a background of uncharged contaminants is the product of collision cross-section and the relative velocity.

In the case that a charged contaminant moves towards a second charged contaminant charged to the same polarity, and for purpose of explanation the second charge is of lower magnitude than the first charge and the contaminant sizes are equal and the electric fields that both charged contaminants experience is the same, then the force between the two similarly charged particles will be attractive if the product of the electric field and the square of the sum of the contaminant radii exceeds the product of the two charges divided by the difference between the magnitudes of those two charges.

In both cases, upon collision the charge may be shared by both collision partners. If the resulting electrostatic repulsion between the similarly charged, contacting contaminants and the fluid shear forces which are exerted upon them are less than the surface adhesion forces, the conglomerate will be stable and charged. If the contaminants are liquid, as in a water-in-oil emulsion, coalescence into a single larger charged drop may occur. The agglomeration and coalescence may continue until each contaminant either reaches the boundary of the liquid mixture or increases in size until it becomes separated from the bulk of the liquid mixture by conventional methods such as centrifugation, settling, or mechanical filtering. For liquid contaminants this will conveniently entail settling (or flotation, depending upon the density of the contimanant phase relative to that of the liquid) of the re-entrained liquid contaminants, to form a distinct continuous contaminant phase, to enable separation of the two liquid phases. Where the contaminant is a gas, the bubbles eventually grow to a size where they become released, due to factors such as buoyancy, from the collector surfaces and can be allowed merely to rise to the surface of the background liquid phase and be collected there or allowed to escape into the atmosphere. Where the contaminant is a solid, migrating contaminant particles can form into agglomerates due to Van der Waal's physical cohesive force, quite apart from any other adhesive forces attributable to the particular contaminant concerned, and a precipitate of contaminant conglomerates will build-up on the bottom of the separation vessel. There may also be a more limited deposition of contaminant on the inner lateral wall surfaces of the separation vessel. Periodic cleaning of the fouled surfaces by backflushing, solvent washing, heating or other techniques will remove the deposited contaminant.

Where there are present mixed dispersed phases such as bubbles and solid precipitates, for example, the bubbles may be driven into contact with the solids and vice versa. The bubble-solid composite contaminant thus formed may rise to the surface by buoyancy forces and form a particulate-laden foam or froth which may conveniently be skimmed from the bulk of the liquid and the solids thereby separated from the liquid. Clearly, other possibilities and combinations exist.

It will be appreciated that the viscosity and conductivity of the background phase need to be sufficiently low such that conglomeration can occur to a sufficient degree that the contaminant can be removed in a suitable manner as mentioned above before any appreciable leakage or depletion of its charge can take place such as would diminish to an ineffective level the electrical migration force acting on the contaminant. Typically the product of the viscosity and conductivity of the continuous liquid phase would not exceed $10^{-7}$ centipoise/ohm-meter.

It is to be noted that when using a charge injector to introduce the net unipolar free charge, it is important that the stream velocity through the charge injector is high enough to transport the charged stream away from the electrode region of the charge injector. The stream velocity needs to exceed the drift velocity of the individual charges relative to the liquid induced by the electric field produced by the charge injector electrodes. On the other hand, the liquid in the separation vessel needs to remain there long enough to enable contaminant migration to the vessel walls. This generally requires a lower velocity throughput in the separation vessel than in the charge injector. Typical values for the throughput velocities in the charge injector and separation vessel are 1 m/sec and 1 cm/sec, respectively. In another embodiment, the internal cross-sectional diameters of the charge injector outlet orifice and the separation vessel are 0.025 cm and 10 cm, respectively. These figures are purely exemplary and have no limiting character.

Various techniques are possible for introducing the free charge into the phase mixture. One particularly simple technique is for the free charge to be introduced by charge injection (as mentioned above) directly into the phase mixture to be treated, using a charge injector. Where, however, the contaminant phase is a gel or a liquid of a kind which tends to form deposits on any contacting surface areas, there is likely to a be a build-up or deposit of contaminant in the region of the charge injector where charge injection occurs, or, in the case of gaseous contaminant, bubbles of contaminant can cause arcing where charge injection occurs. In either case charge injection efficiency can be significantly impaired and thereby the overall efficiency of the separation process. To overcome this problem, the free charge may be introduced by charge injection into a stream of substantially contaminant-free continuous fluid phase that may be, but need not necessarily be, the same as the continuous fluid phase in the phase mixture to be treated. In this arrangement, both the charged second-mentioned continuous fluid phase and the phase mixture to be treated are mixed together, suitably in the primary conglomerating region of the separation vessel, so that, in that region, the self-induced electric field is established and charge transfers to the contaminant phase. The injection of charge into the contaminant-free stream avoids the possibility of partial or complete blockage by contaminants of the charge injector or arcing.

In the case that the contaminant-free stream used to transport charge into the separation vessel is different from the continuous fluid phase in the phase mixture to be treated, some means needs to be provided to separate (such as by distillation, flashing or membrane separation) the second fluid for re-use from the clarified first fluid phase.

It is stressed that the electric field is the result not of voltage applied to any electrodes, but rather arises from the total introduced or injected charge distribution in the fluid in the separation vessel and on the contaminants and any separation vessel wall surface regions or internal collector surfaces where separation occurs.

Taking the concept of the present invention to its limit, it will be appreciated that providing the primary conglomerating region within the separation vessel is made large enough and that sufficient charge is injected with regard to the density of the contaminant phase and the viscosity and and conductivity of the continuous liquid phase, all or substantially all of the contaminant phase will come out of suspension and either bubble off or separate out as a distinct layer of contaminant phase without any contact with the wall surfaces bounding the primary conglomerating region. This can be advantageous in that there is then no need to have to clean contaminant fouling from the wall surfaces bounding the primary conglomerating region. Normally, however, some of the contaminant phase may migrate into contact with the inner wall surfaces of the separation vessel and conglomerate there. Solid and gel-like contaminant particles will tend to deposit on those wall surfaces, whereas gaseous and liquid continuously will usually separate out as bubbles or settling droplets.

In accordance with a preferred way of performing the method of this invention and in accordance with a preferred embodiment, when separating-out a dispersed liquid contaminant phase from a continuous liquid phase, the contaminant phase being of higher density, the conglomerated contaminant phase, which separates-out as droplets from the phase mixture in the primary conglomerating region of the separation vessel under gravity, sinks to a secondary conglomerating region, located below the primary conglomerating region. This secondary region comprises a multiplicity of exposed collector surfaces within the phase mixture, so that further coalescence of the contaminant droplets will occur on those exposed collector surfaces. In other words, a certain degree of droplet size growth is achieved in the primary conglomerating region and this growth is continued further in the secondary conglomerating region while in contact with the exposed collector surfaces, whereby the fully grown droplets developed in the secondary conglomerating region can settle out readily under gravity to form a distinct layer of contaminant phase in the bottom of the separation vessel. Suitably, the collector surfaces in the secondary conglomerating region are provided by a bed of closely packed beads of a material which has low conductivity and may be non-porous or porous.

The primary conglomerating region may be designed so that all of the excess charge is contained within this region and there is no excess charge in the secondary region. Hence, the configuration of the collector surfaces and their material of construction may be chosen so as to optimise settling of the liquid droplets. Means for accomplishing this are well known to those skilled in the art.

In accordance with a preferred feature of the invention, the separation vessel is provided with means responsive to the level of liquid in the primary conglomerating region for regulating the rate of supply of phase mixture to be treated, so as to maintain the level substantially constant. In this way, the volume of charged liquid in the primary conglomerating region is maintained substantially constant, so that the required degree of initial growth of droplet size can occur within the primary conglomerating region.

In accordance with another aspect of the invention, there is provided apparatus for use in separating a dispersed liquid contaminant phase from a phase mixture comprising the contaminant phase dispersed in a continuous liquid phase, wherein the apparatus comprises an electrostatic charge injector including a pointed high potential electrode and means for flowing said liquid phase mixture to be treated past said electrode at sufficient velocity that charge that is net unipolar is injected and transported into the liquid phase mixture. The apparatus further comprises a separation vessel into which the charge injector is arranged to issue the charged liquid phase mixture through a gas or vapor space between the charge injector and separation vessel. In the manner described above, an induced electric field is set up in the separation vessel and this drives the charged contaminant phase towards the bounding wall surfaces of the separation vessel. This vessel comprises a first conglomerating region in its upper region which is free of internal collector surfaces within the liquid phase mixture and a second conglomerating region, below the first conglomerating region, which contains a bed of densely packed beads of low electrical conductivity so that droplets of contaminant phase settling out under gravity in the first conglomerating region will sink to the bed of beads in the second region and coalesce on the exposed surfaces of the beads before settling out into a distinct layer of contaminant phase in a region in the separation vessel below the second conglomerating region.

Alternatively, as already mentioned above, the charge could be introduced into a contaminant-free stream which is then combined with the uncharged contaminant-laden stream in the primary conglomeration region of the separation vessel. In this particular case, it is preferred, for simplicity, that means are provided for continuously re-circulating a proportion of the contaminant phase forming the distinct layer in the separation vessel back through the charge injector. In either arrangement, it is desirable to employ an automatic level control system as described above for maintaining the level of the body of liquid in the separation vessel at a predetermined position.

It is to be noted that the collector surfaces need not necessarily be stationary. For example, the stream of liquid in which conglomeration of the contaminants has occurred issuing from the primary conglomeration section could be seeded with collector beads before the stream enters the secondary conglomeration section of the separation vessel and the beads removed from the liquid again at a downstream location. For this purpose, the secondary conglomeration region could be provided with a bead inlet near the top and a bead outlet at the bottom. Alternatively, the bed of beads comprising the secondary conglomeration section can be fluidised. One way in which this can be achieved is using a concentric cylinder arrangement for the separation vessel with the beads at least partially filling the annular gap between the two cylinders and pressurising the gas space above the separation vessel to drive the charged liquid inside the inner cylinder into the annular space from below.

Where the continuous fluid phase is a gas essentially similar considerations apply. However, the volume throughput in the separation vessel will be considerably higher and this will necessitate a much larger and/or wider separation vessel. In addition, the flow path for the phase mixture between the charge introducing means and the separation vessel will need to be fully enclosed.

With the present invention, it is possible to provide an apparatus and method for the effective separation of dispersed phase from a continuous fluid phase, especially where the mean contaminant size is very small (e.g. of the order of 0.1 to 100 microns in diameter).

The contaminant separation apparatus can be made to be simple in construction and reliable in operation, whilst a contaminant separation method can be provided which is simple to put into effect. With the invention, it is possible to attain a high level of purity of the clarified continuous phase.

It will be appreciated that the invention is not limited to separating a single contaminant from the mixture. Two or more contaminant species may be separated, providing each of them forms, or the contaminant phases are combined to form, a dispersed phase within the background fluid phase.

BRIEF DESCRIPTION OF THE DRAWINGS

The foregoing and other advantages and benefits of the invention will become apparent from the following description given, by way of example, with reference to the accompanying single drawing, in which.

In the figures, the same references denote the same or corresponding parts.

DESCRIPTION OF THE PREFERRED EMBODIMENTS

Figure 1:
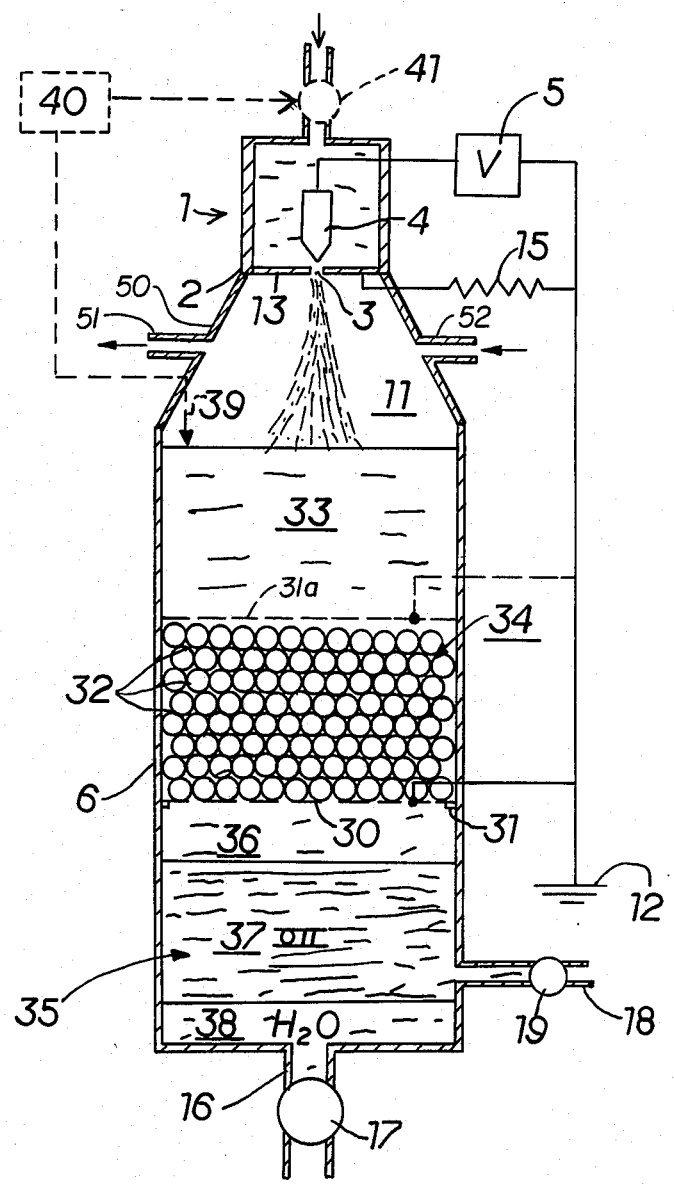
FIG. 1 shows, diagrammatically, a vertical section through one form of contaminant separation apparatus in accordance with the invention, adapted for the breaking of a water-in-oil emulsion.

Referring to FIG. 1, a mixture consisting of a dispersed phase in a continuous background phase, in this case a water-in-oil emulsion, is introduced into the inlet of a charge injector 1 which injects free charge (net positive or negative) into the mixture. However, it is to be understood that two streams of opposite charge or alternating net positive and net negative streams may be used instead.

Suitably, the charge injector 1 is constructed in accordance with the teaching of the aforesaid U.S. Pat. No. 4,255,777 to which reference is directed for a more complete disclosure of the construction and operation of the charge injector. However, in substance, such a charge injector, as shown, essentially comprises an upright, suitably cylindrical, chamber 2 through which the mixture passes, having a bottom wall 13, with an orifice or opening 3, at one end and a sharply pointed electrode 4 connected to the high potential terminal of voltage power supply 5 whose earth terminal is grounded at 12, the tip of the electrode 4 being located closely above, and in axial alignment with, the opening 3. The chamber bottom wall 13 serves as a second electrode which is maintained at a lower voltage, relative to earth, than pointed electrode 4, by means of a connection 4 to earth 12. This connection may be made through a resistance element 15. Charge is injected by the pointed electrode 4 predominantly by field emission, into the water-in-oil emulsion issuing through the opening 3 and the charged emulsion issues or sprays, through a gas or vapor space 11, into an upright vessel or reservoir 6 located below the charge injector 1. As shown, gas or vapor space 11 is enclosed by a frusto-conical shaped cap 50 of the separation vessel, on which the charge injector body is mounted, and the space 11 is open to the atmosphere through pipe 51. Alternatively, the separation vessel may be sealed and a purge gas may be circulated through the space using inlet and outlet pipes 52, 51. In another arrangement, gas space 11 is pressurized from an external source (not shown). A horizontal metallic gauze 30 located within vessel 6 approximately halfway up its height on an internal supporting shoulder 31 is also connected to earth 12 and completes the electrical circuit of the charge injector. A bed of densely packed collector beads 32, for example glass beads, rests on the gauze 30 and occupies approximately half of the volume within vessel 6 above the gauze. An alternative location for the gauze electrode is when it covers the collector beads 32, as shown at 31a in FIG. 1. In this arrangement, other means for supporting the bed of collector beads 32 would need to be provided.

Thus, the vessel interior comprises, working from the top downwards, an uppermost section 33 which is free of any collector surfaces apart from the internal wall regions of vessel 6 and which constitutes a primary conglomerating region, the section 34 which is occupied by the beads 32 and which serves as a secondary conglomerating region, and separation region 35 in which the emulsion breaks up into a charged water-in-oil layer 36, an oil layer 37 and a water layer 38. The smallest dimension of the uppermost section 33 should preferably be at least 100 times greater than the initial average distance between contaminants. The beads suitably are glass beads, but they may instead be made of other materials of low conductivity, e.g. plastics or ceramics generally.

It is to be noted that if there were no primary coalescing region provided by section 33 devoid of any beads, separation of the contaminant might not in every case (e.g. water-in-oil emulsions) be wholly effective with very small droplets, but this drawback is overcome in the present embodiment because the primary coalescing region 33 grows the droplets to a sufficient size that effective separation can occur in the bead separation region.

The stream issuing downwardly through opening 3 may break into a spray at a short distance below the opening in air gap 11, depending on the charging potential of the charge injector, but the existence of a spray is not critical to the effective operation of the separation apparatus. The separation vessel 6 is provided in the bottom thereof with an outlet pipe 16, including a valve 17, for discharging water from the separation vessel. Similarly, the vessel 6 has in its side wall an outlet pipe 18, including a valve 19, located above the oil/water interface for releasing clarified oil from vessel 6.

It is to be noted that because of the very large cross-sectional area of the interior of vessel 6 as compared with that of the stream of charged phase mixture emerging through outlet 3, the stream velocity through the charge injector 1 is relatively high, so as to ensure an adequate level of charge injection, whereas the downward velocity of the body of liquid in vessel 6 is very small. Typical dimensions for the internal cross-sectional diameter of the separation vessel and the spray outlet diameter are 10 cms and 0.005 cms respectively.

In operation, with valves 17 and 19 set to determine flow rates for clarified water and oil which match the flow rate through charge injector 1, or by selective opening and closing valves 17, 19 so as to maintain the body of liquid in vessel 6 at an approximately constant level close to the top of the separation vessel, excess charge carriers are induced to be emitted from the sharply pointed end of electrode 4 when this electrode is maintained at a sufficiently high negative potential with respect to spray opening 3. The charge carriers are then swept from the pointed electrode 4 by the cross flow of the water-in-oil emusion to be clarified issuing through the orifice 3. Within upper region 33, the major portion of the injected charge has transferred to the water droplets, so as to drive the droplets towards the bounding wall surfaces of separation vessel 6. The internal dimensions of separation vessel in region 33 are chosen to be much larger (typically 100 times or more) than the mean inter-droplet spacing within the continuous oil phase. In this way coalescence of the migrating water droplets will occur for most of the water droplets within region 33 before the droplets reach the internal wall surfaces of the separation vessel, and larger water droplets are thus formed. Other droplets will reach the inner wall surfaces of the separation vessel and coalesce there, to form larger droplets which break away from the wall surfaces, or a surface water film may be formed on the separation vessel wall to promote settling of the water contaminant. The larger droplets as formed in both ways start to settle, due to the effects of gravity and downward flow within separation vessel 6, the downward settling being superimposed on the droplet migration in the generally radial direction, and the droplets accordingly encounter the collector beads 32 in section 34, on whose exposed surfaces the droplets coalesce further, and then become detached from the bead surfaces and separate out to form a bottom, water layer 38. It will be appreciated that the close packing of the beads provides very short migration paths for the droplets to enhance water separation. The oil from which the water droplets have been removed tends to separate out into oil layer 37 floating on top of water layer 38, water-in-oil emulsion occupying the remainder of the volume taken up by the body of liquid in vessel 6 and which fills section 33, the interstices between the beads, and water/oil layer 36. Where valves 17, 19 are set to define predetermined flow discharge rates for the clarified water and oil phases, an optional level control arrangement can be used to keep the level of charged water-in-oil emulsion in section 33 substantially constant, this arrangement comprising a controller 40 which responds to the level detected by a level sensor 39 and controls the opening of a regulator 41 in the input line to the charge injector 1 so as to reduce any error between the output from level sensor 39 and an input signal representing the desired level.

Figure 2:
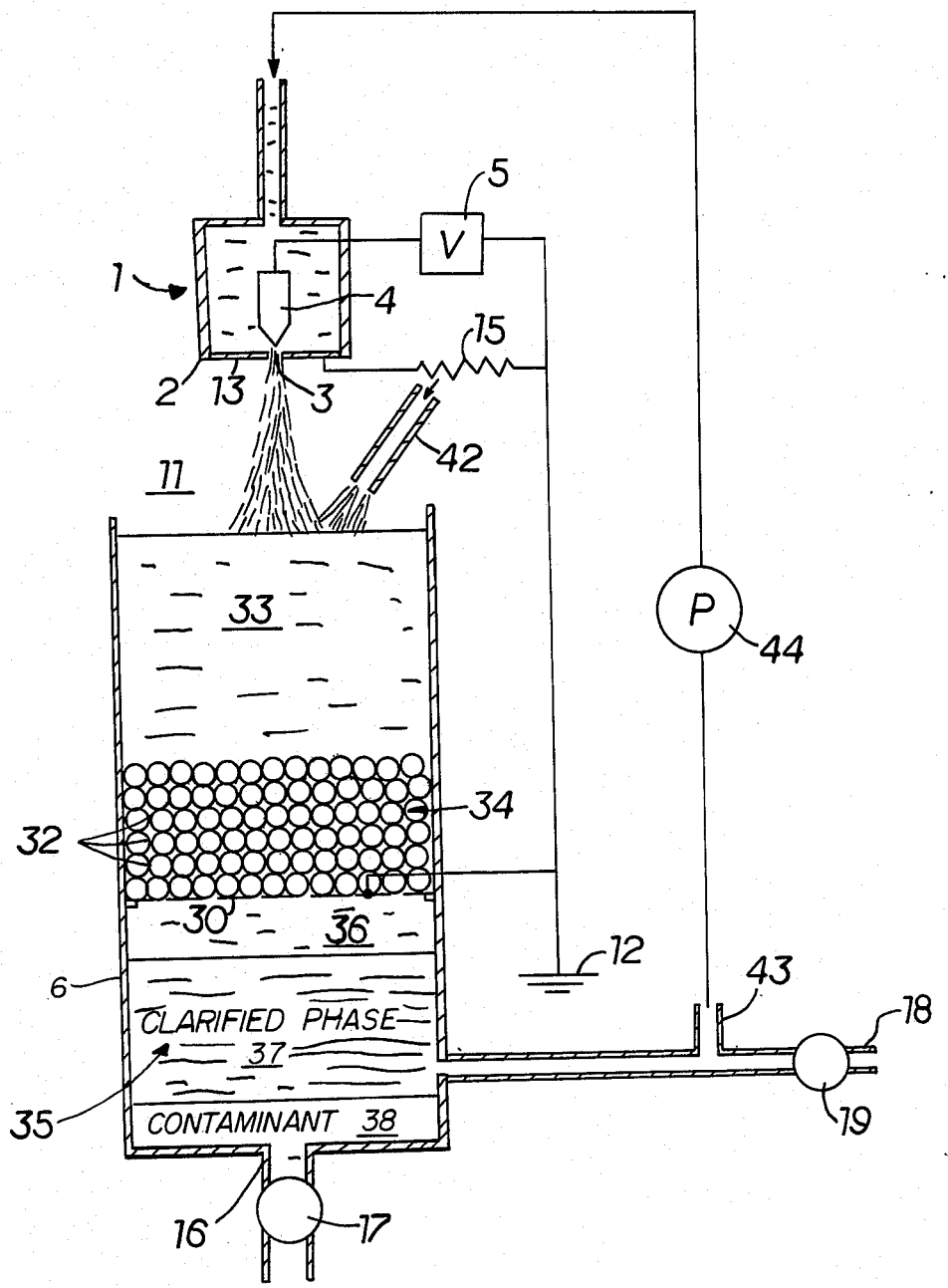
FIG. 2 is a corresponding view of a second embodiment.

The apparatus depicted in FIG. 1 will generally operate satisfactorily for water-in-oil emulsions. However, in the case of certain contaminants, particularly solid particles and gels, there is a likelihood or certainty of contaminant building-up with time in the region of opening 3, thus unfavourably affecting the charging efficiency of the charge injector and resulting in partial or complete blockage ultimately. Alternatively, where bubbles of contaminant gas are present, these can lead to arcing in the charge injector. The embodiment shown in FIG. 2 is designed to overcome these shortcomings. Here, the contaminated liquid is kept separate from the charge injector and passed along a delivery pipe 42 from which it is discharged through gas or vapor gap 11 into upper section 33 of separation vessel 6. A line 43, including pump 44, branches out from outlet pipe 18 upstream of valve 19 and leads back to the inlet of charge injector 1. Therefore, the liquid into which charge is injected is substantially contaminant-free. The charged contaminant-free liquid issuing from charge injector 1 and the uncharged contaminated liquid discharged from delivery pipe 42 are brought into contact with one another in upper section 33 of the separation vessel and mix there. Charge transfers in this region to the contaminant phase. In all other respects, the operation of this modified separation apparatus is the same as is the FIG. 1 embodiment. As before, a level control arrangement can optionally be employed.

The foregoing description will now be illustrated by way of two examples.

EXAMPLE 1

An experiment was run using micro-size water droplets dispersed in a variety of lube base stocks and paraffinic white oils. The experimental apparatus was as shown schematically in FIGS. 1 and 2. In both cases charge was injected and charge transfer and droplet coalescence occurred in the upper or coalescence section of the separation vessel. The emulsion now containing larger water droplets was passed through the bed of packed glass beads. As the charged emulsion passed through the bed large water droplets settled out on the bead surfaces. Some of the water adhered to the bead surfaces while the remainder drained off into the emulsion where it settled into a water layer at the bottom of the separation vessel.

The water was introduced into the oils by either contacting the oil with steam or by subjecting the oil and added water to a high velocity shear. The resulting water-in-oil emulsion was allowed to settle for 12 hours and a sample decanted from the top of the separation vessel. The water content was measured before and after the experiment using a variant of a Karl Fischer titration technique. The average size of the water droplets was of the order of 2 microns in diameter as determined by optical microscopy. Injected charge densities of $\sim 0.2$ C m$^{-3}$ were employed and flow rates of 12 cm$^3$ s$^{-1}$ were maintained through the charge injector. The power dissipated was $\sim 50$ mw during the run. The sample size was 1 liter and the flow rates through the packed beads comprising 0.4 cm beads varied with the sample concerned but was no greater than 10 cm$^3$ s$^{-1}$. The bead height was 12 cm and diameter was 8 cm. Passing the emulsion through the apparatus without charge injection resulted in removal of some of the water (~50%). This number varied considerably. However, when the charge injector was switched on, the results set out below were obtained. The results listed in the table are the best results of a series of experiments and show the effectiveness of the separation technique.

TABLE

Best Results of Charged Fluid Coalescence Tests
Coalescence Tests for Several Viscous Oils with
Added Dispersed Water

| Feed | Viscosity @ 20° C. (cp) | Excess H$_2$O (ppm) In | Excess H$_2$O (ppm) Out |
|---|---|---|---|
| Marcol 52 (white oil) | 11 | 820 | 8 |
| SI50N (lube base oil) | 55 | 531 | 8 |
| Marcol 52/Primol 355 (white oil mixture) | 95 | 355 | 5 |
| Primol 355 (white oil) | 155 | 630 | 32 |
| S600N (lube base oil) | 255 | 800 | 8 |
| S600N (lube base oil) | 255 | 7000 | 400 |
| Bright Stock (lube base oil) | 2100 | 550 | 70 |

EXAMPLE 2

By way of a second example, we have demonstrated that wax crystals, which may be present as a dispersed contaminant phase in a crude or lubricating oil, may be made to agglomerate in the bulk of the liquid by the injection of free excess charge.

Marcol 52, a highly refined white oil manufactured by Exxon Chemical Company, was mixed with a waxy raffinate from a commercial lubricating oil dewaxing plant which contained 15% wax. The wax content of the final mixture was 0.25%. The mixture was stirred at an elevated temperature of about 60° C. Upon cooling wax crystals were precipitated from the mixture to form a dispersion of wax in the white oil.

The wax-containing white oil was passed through a charge injector and into a vessel such as shown in FIG. 1, except that the separation vessel contained no beads. The wax crystal size distribution upon sampling with an optical image analyzer and without charge injection is shown as the continuous curve in FIG. 3. The size distribution had a mean value of 14$\mu$ diameter and 70% of the crystals were smaller than 20$\mu$.

Figure 3:
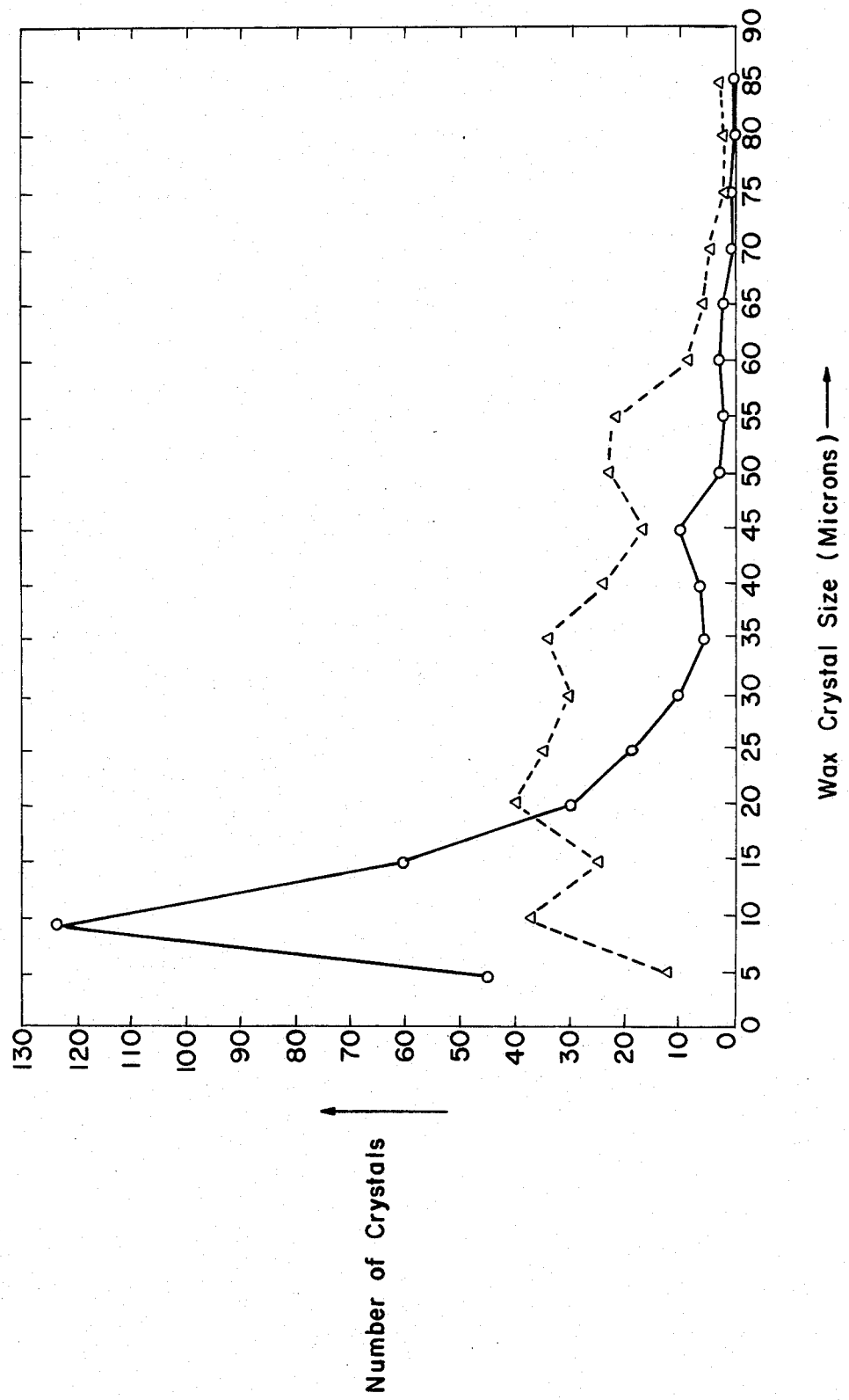
FIG. 3 is a graph demonstrating the coalescence which occurs in the case of a white mineral oil contaminated with wax crystals, when treated using similar apparatus to that of FIG. 1 except that no beads were present.

Subsequent to passing the two-phase mixture through the apparatus with charge injection occurring, the measured size distribution is shown on the dashed, broken line in FIG. 3. It can be seen that a significant amount of agglomeration occurred increasing the mean wax crystal size to 30$\mu$ with the particles below 20$\mu$ decreasing their fraction to 23%.

What is claimed is:

1. A method for use in the separation of a dispersed contaminant phase from a continuous liquid phase, the two phases together forming a phase mixture, by producing migration of dispersed phase within the phase mixture, said method comprising the steps of:

(1) introducing free charge that is net unipolar into said phase mixture, at least predominantly by electron emission which causes the continuous phase to act as a medium through which volumetric distribution of the introduced charge takes place, there being a sufficient excess of free charge introduced such that the volumetric charge distribution causes, in a vessel containing a quantity of the charged phase mixture, both an electric field to be induced in the mixture and the dispersed contaminant phase to become charged, and the induced electric field and the charge on the dispersed phase interact to produce an electrical driving force acting on the dispersed phase so that said migration is due substantially to said driving force, the separation vessel, in a primary conglomerating region thereof, being free of internal collector surfaces within said phase mixture and having internal dimensions which are larger than the mean inter-contaminant spacing for the contaminant dispersed phase within the phase mixture, such that at least some conglomeration of the migrating contaminant phase will occur within the phase mixture in said primary conglomerating region; and (2) allowing conglomeration of the migrating dispersed contaminant phase within said phase mixture to occur to a sufficient degree that conglomerations of contaminant phase are brought out of suspension in the phase mixture.

2. A method as claimed in claim 1, further comprising separating the conglomerations of contaminant phase from the phase mixture.

3. A method as claimed in claim 1, wherein the free charge is introduced, at least predominantly by field emission, into a stream of substantially contaminant-free continuous liquid phase that is the same as the continuous liquid phase in the phase mixture, and both the charged second-mentioned continuous liquid phase and the phase mixture to be treated are mixed together, whereby, in the primary conglomerating region of the separation vessel, charge transfers to the contaminant phase and the self-induced electric field is established.

4. A method as claimed in claim 2, wherein the charged substantially contaminant-free continuous liquid phase is passed through a vapor or gas space before it is introduced into the separation vessel.

5. A method as claimed in claim 1, for separating-out a dispersed liquid contaminant phase from a continuous liquid phase, the contaminant phase being of higher density, wherein the conglomerated contaminant phase, which separates-out as droplets from the phase mixture in said primary coalescing region under gravity, is allowed to sink to a secondary conglomerating region, located below the primary conglomerating region, containing further phase mixture and a bed of closely packed beads of a material which has low conductivity, which are exposed to that phase mixture so that further conglomeration of the contaminant droplets will occur on the exposed surfaces of the packed beads.

6. A method as claimed in claim 1, wherein the free charge is introduced into a stream of said mixture, at least predominantly by field emission, and the charged stream is passed through a gas or vapor space, before entering said vessel, for minimizing charge dissipation from the charged phase mixture in said primary conglomerating region back to where the free charge introduction took place.

7. A method as claimed in claim 1, wherein the free charge is introduced without producing ionic dissociation within the phase mixture.

8. A method for use in the separation of a dispersed contaminant phase from a continuous liquid phase, the phases together forming a phase mixture, by producing migration of dispersed phase within the phase mixture, said method comprising the steps of:

(1) introducing free charge that is net unipolar into the phase mixture in such manner as to cause the continuous phase to act as a medium through which volumetric distribution of the introduced charge takes place;

(2) passing the charged phase mixture into a separation vessel, the charged phase mixture, before entering said vessel, being directed as a stream through a gas or vapor space for minimizing charge dissipation from the charged phase mixture in said vessel back to where the free charge introduction took place, there being a sufficient excess of free charge introduced such that the volumetric charge distribution causes, in said vessel, an electric field to be induced in the phase mixture and the dispersed phase to become charged, and the induced electric field and the charge on the dispersed phase interact to produce an electrical driving force acting on the dispersed phase so that said migration is due substantially to said driving force, the separation vessel, in a primary conglomerating region thereof, being free of internal collector surfaces within said phase mixture and having internal dimensions which are larger than the mean inter-contaminant spacing for the contaminant dispersed phase within the phase mixture, such that at least some conglomeration of the migrating contaminant phase will occur within the phase mixture in said primary conglomerating region; and (3) allowing conglomeration of the migrating dispersed contaminant phase to occur to a sufficient degree that conglomerations of contaminant phase are brought out of suspension in the phase mixture.

9. A method according to claim 8, wherein the gas or vapor space is enclosed and a purge gas is flowed through said gas space.

10. A method as claimed in claim 8, for separating-out a dispersed liquid contaminant phase from a continuous liquid phase, the contaminant phase being of higher density, wherein the conglomerated contaminant phase, which separates-out as droplets from the phase mixture in said primary coalescing region under gravity, is allowed to sink to a secondary conglomerating region, located below the primary conglomerating region, containing further phase mixture and a bed of closely packed beads of a material which has low conductivity, which are exposed to that phase mixture so that further conglomeration of the contaminant droplets will occur on the exposed surfaces of the packed beads.

11. A method as claimed in claim 8, wherein the free charge is introduced predominantly by electron emission.

12. A method as claimed in claim 8, wherein the free charge is introduced without producing ionic dissociation within the phase mixture.

13. A method as claimed in claim 8, wherein said primary conglomerating region has internal dimensions which are at least one hundred times larger than the mean inter-contaminant spacing for the contaminant dispersed phase.

14. A method of separating a dispersed contaminant phase from a continuous liquid phase, the phases together forming a liquid phase mixture, by producing migration of dispersed phase within the phase mixture, said method comprising the steps of:

(1) flowing a stream of the phase mixture past a pointed high potential electrode at sufficient velocity that free charge that is net unipolar is injected by field emission into the liquid mixture and is conveyed by the flowing stream away from the high potential electrode, the free charge being injected into the phase mixture stream in such manner as to cause the liquid to act as a medium through which volumetric distribution of the injected charge occurs;

(2) causing the charged stream to enter into a separation vessel through a gas or vapor space for minimizing charge dissipation from the charged phase mixture in the separation vessel back to where the free charge introduction took place, there being a sufficient excess of free charge introduced such that the volumetric charge distribution causes an electric field to be induced in the mixture in the vessel and the dispersed phase there to become charged, and the induced electric field and the charge on the dispersed phase interact to produce an electrical driving force acting on the dispersed phase so that said migration is due substantially to said driving force, the separation vessel, in a primary conglomerating region thereof, being free of internal collector surfaces within said phase mixture and having internal dimensions which are larger than the mean inter-contaminant spacing for the contaminant dispersed phase within the phase mixture, such that at least some conglomeration of the migrating contaminant phase will occur within the phase mixture in said primary conglomerating region;

(3) maintaining the liquid mixture in the vessel for sufficient time for conglomerations of contaminant phase to be brought out of suspension in the liquid phase mixture; and (4) separating the conglomerations of contaminant phase from the phase mixture.

15. Apparatus for use in the separation of a dispersed phase from a continuous liquid phase, the phases together forming a phase mixture, by producing migration of dispersed phase within the phase mixture, said apparatus comprising:

(1) means arranged to introduce free charge that is net unipolar into the phase mixture in such manner as to cause the continuous phase to act as a medium through which volumeteric distribution of the introduced charge takes place;

(2) a separator comprising a vessel into which, in use of said apparatus, phase mixture, charged by the free charge introducing means, is passed;

(3) flow control means operable for retaining a body of said charged phase mixture in the vessel and for discharging substantially dispersed-phase-free continuous liquid phase from the vessel, continuously or periodically; and (4) a gas or vapor space which separates the phase mixture in the vessel from the free charge introducing means and through which the free charge introducing means is arranged to direct a stream of charged phase mixture before entering said vessel, for minimizing charge dissipation from the charged phase mixture in said vessel back to the free charge being arranged to introduce a sufficient excess of free charge such that the volumetric charge distribution causes, in said body of charged phase mixture in said vessel, an electric field to be induced in the phase mixture and the dispersed phase to become charged, and the induced electric field and the charge on the dispersed phase interact to produce an electrical driving force acting on the dispersed phase so that said migration is due substantially to said driving force, the separation vessel, in a primary conglomerating region thereof, being free of internal collector surfaces within said phase mixture and having internal dimensions such that for a contaminant dispersion for which said internal dimensions of said primary conglomerating region are larger than the mean inter-contaminant spacing for the contaminant dispersion within the phase mixture, at least some conglomeration of the migrating contaminant phase will occur within the phase mixture in said primary conglomerating region to a sufficient degree that conglomerated contaminant phase is brought out of suspension in the phase mixture, leaving substantially dispersed-phase-free continuous liquid phase for discharge from said vessel by said flow control means.

16. Apparatus according to claim 15, wherein said free charge introducing means is positioned spaced away from the vessel top and arranged to direct said stream of charged phase mixture into said vessel through an opening in the top thereof.

17. Apparatus as claimed in claim 15, wherein the gas space is enclosed and means are provided for flowing a purge gas through said enclosed space.

18. Apparatus as claimed in claim 15, wherein said gas space is pressurized.

19. Apparatus as claimed in claim 15, wherein the free charge introducing means comprises a charge injector arranged to inject free charge, at least predominantly by field emission, into the phase mixture.

20. Apparatus for use in separating a dispersed liquid contaminant phase from a continuous liquid phase, the phases together forming a liquid phase mixture and the density of the liquid forming the contaminant phase being larger than that of the continuous liquid phase, by producing migration of dispersed phase within the phase mixture, said apparatus comprising a charge injector including a pointed high potential electrode; means for flowing a stream of said phase mixture past said electrode at sufficient velocity that free charge that is net unipolar is injected by field emission into the liquid phase mixture and is conveyed by the flowing stream away from the high potential electrode, the charge injector being arranged to inject the free charge into the phase mixture stream in such manner as to cause the continuous phase to act as a medium through which volumetric distribution of the injected charge occurs; a separator comprising a separation vessel into which the charge injector is arranged to pass the charged stream through a gas or vapor space between the charge injector and separation vessel, the gas or vapor space serving to minimize charge dissipation from the charged phase mixture in the separation vessel back to the charge injector, the charge injector being arranged to inject a sufficient excess of free charge into the phase mixture such that the volumetric charge distribution causes an electric field to be induced in the phase mixture in the vessel and the dispersed phase there to be charged, and the induced electric field and the charge on the dispersed phase interact to produce an electrical driving force acting on the dispersed phase so that said migration is due substantially to said driving force, the separation vessel containing a first conglomerating region in its upper region which is free of internal collector surfaces within the liquid phase mixture and a second conglomerating section, below the first coalescing region, which contains a bed of densely packed beads of low electrical conductivity; means operable or operative to maintain a body of the liquid mixture in the vessel for sufficient time for droplets of contaminant phase formed by conglomeration of migrating contaminant phase within the liquid mixture in the primary conglomerating region and settling out under gravity in the first conglomerating region to sink to the bed of beads in the second region and conglomerate further on the exposed surfaces of the beads before settling out into a distinct layer of contaminant phase in a region in the separation vessel below the second conglomerating region, thereby leaving a quantity of substantially dispersed-phase-free continuous liquid phase in another region in said separation vessel; and means operable for discharging such dispersed-phase-free continuous liquid phase from said vessel, continuously or periodically.

21. Apparatus as claimed in claim 20, wherein said means operable or operative to maintain a body of the liquid mixture in the vessel comprises means responsive to the level of liquid in the first conglomerating region for regulating the rate of supply of phase mixture to be treated to the charge injector so as to maintain said level substantially constant.

22. Apparatus for use in separating a dispersed liquid contaminant phase from a continuous liquid phase, the phases together forming a liquid phase mixture and the density of the liquid forming the contaminant phase being larger than that of the continuous liquid phase, by producing migration of dispersed phase within the phase mixture, said apparatus comprising a charge injector including a pointed high potential electrode; a separator comprising a separation vessel; means for flowing a stream of contaminant-free liquid phase that is the same as said continuous liquid phase past said electrode at sufficient velocity that free charge that is net unipolar is injected by field emission into that liquid phase and is conveyed by the flowing stream away from the high potential electrode and into said separation vessel; means for introducing phase mixture to be treated into the separation vessel so that said phase mixture and said contaminant-free liquid phase come into contact with one another in the separation vessel, the charge injector being arranged to inject the free charge into the liquid phase stream in such manner as to cause that liquid phase and the continuous phase of the phase mixture to be treated to act as a medium through which volumetric distribution of the injected charge occurs; a gas or vapor space, between the charge injector and separation vessel, through which the charge injector is arranged to pass the charged stream before entering the separation vessel, the gas or vapor space serving to minimize charge dissipation from the charged phase mixture in the separation vessel back to the charge injector, the charge injector being arranged to inject a sufficient excess of free charge into the contaminant-free liquid phase such that that the volumetric charge distribution causes an electric field to be induced in the phase mixture in the vessel and the dispersed phase there to be charged, and the induced electric field and the charge on the dispersed phase interact to produce an electrical driving force acting on the dispersed phase so that said migration is due substantially to said driving force, the separation vessel containing a first conglomerating region in its upper region which is free of internal collector surfaces within the liquid phase mixture and a second conglomerating section below the first coalescing region, which contains a bed of densely packed beads of low electrical conductivity; means operable or operative to maintain a body of the liquid mixture in the vessel for sufficient time for droplets of contaminant phase formed by conglomeration of migrating contaminant phase within the liquid mixture in the primary conglomerating region and settling out under gravity in the first conglomerating region to sink to the bed of beads in the second region and conglomerate further on the exposed surfaces of the beads before settling out into a distinct layer of contaminant phase in a region in the separation vessel below the second conglomerating region, thereby leaving a quantity of substantially dispersed-phase-free continuous liquid phase in another region in said separation vessel below the second conglomerating region; and means operable for discharging such dispersed-phase-free continuous liquid phase from said vessel, continuously or periodically.

23. Apparatus as claimed in claim 22, wherein said means operable or operative to maintain a body of the liquid mixture in the vessel comprises means responsive to the level of liquid in the first conglomerating section for regulating the rate of supply of phase mixture to be treated to the charge injector so as to maintain said level substantially constant.

* * * * *